(Model.) 2 Sheets—Sheet 1.

W. M. ARNALL.
Cockle and Garlic Machine.

No. 236,206. Patented Jan. 4, 1881.

WITNESSES.
Thos A. Curtis
J. Powell Spindler

William M. Arnall INVENTOR.
By Ashby Newman & Co ATTORNEYS.

(Model.)

2 Sheets—Sheet 2.

W. M. ARNALL.
Cockle and Garlic Machine.

No. 236,206.

Patented Jan. 4, 1881.

WITNESSES.
Thos. A. Curtis
J. Powell Spindle

William M. Arnall INVENTOR.
By
Ashby Newman & Co
ATTORNEYS

UNITED STATES PATENT OFFICE.

WILLIAM M. ARNALL, OF SPERRYVILLE, VIRGINIA.

COCKLE AND GARLIC MACHINE.

SPECIFICATION forming part of Letters Patent No. 236,206, dated January 4, 1881.

Application filed July 30, 1880. (Model.)

*To all whom it may concern:*

Be it known that I, WILLIAM M. ARNALL, of Sperryville, in the county of Rappahannock, in the State of Virginia, have invented certain new and useful Improvements in Cockle and Garlic Machines; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
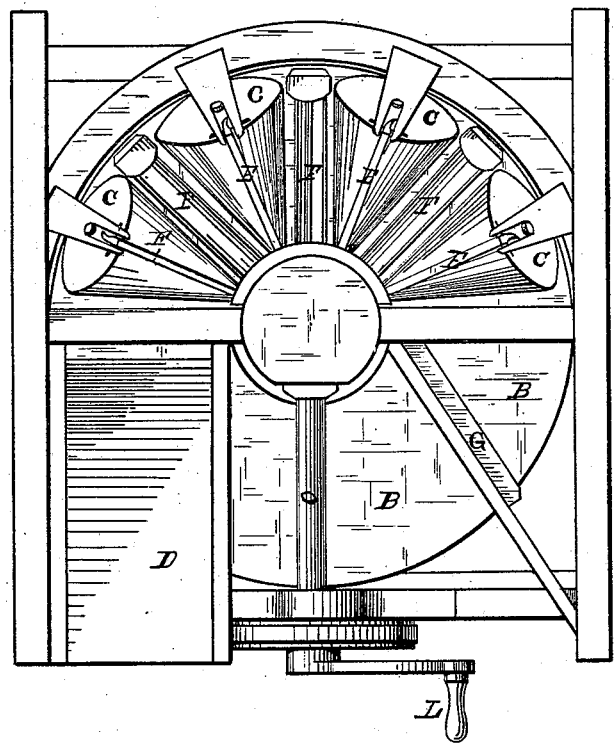
Figure 2:
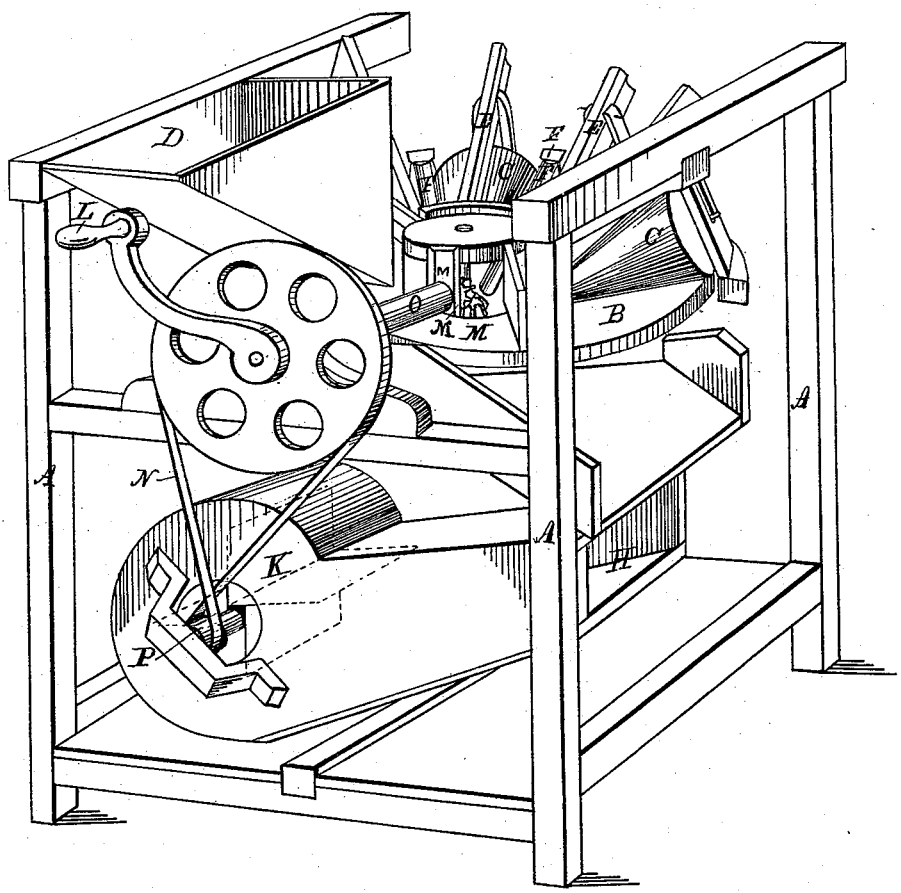

In the drawings, Figure 1 is a view from the top of my improved machine, and Fig. 2 a side view.

A A A is the frame of the machine. B B B is a revolving table, covered with sheet-iron or any metal or material that will produce the desired effect—that is, to press the grain firmly against the conical rollers C C C C, that are placed on the revolving table, these rollers being covered with cloth, felt, or any other material that is equivalent, for the adhesion of the cockle.
The cockle being a burr and the wheat smooth, the wheat and cockle is discharged from the hopper D, and passes between the table and rollers equalized in its transit, causing the cockle to adhere to the rollers, and lifting it directly from the wheat to the top of the rollers, when the cockle which is adhering to the rollers is met by scrapers or brushes E E E, or their equivalent, which each roller is provided with, for the purpose of docking the cockle off as it passes under the scrapers or brushes, or their equivalent, there being a spout, F F F F, between the rollers to catch the cockle as it is scraped or brushed off. The cockle then passes down the spouts to the center of the table, and down to a receptacle in the bottom of the machine. The wheat, after the cockle has been picked out, is carried around to a scraper, G, and is pushed off of the revolving table, and is passed through a heavy current of air at H, which is produced by the fan K under the table, removing the garlic and other foreign substances that may have been left after the removal of the cockle, by means heretofore specified, leaving the wheat in a perfectly clean condition. A crank, L, is, by means of the shaft O and cog-wheels M, connected with the revolving table B, and by turning the crank L motion is given to the revolving table, and by means of the band N and the pulley P motion is given to the fan K.

Having described my invention, I claim as new and desire to secure by Letters Patent—

1. The combination of the revolving table and the conical roller having a surface adapted to cause the adhesion of cockle, substantially as described.

2. The combination of a revolving table, a conical roller or rollers, and a spout or spouts for conveying off said material, substantially as described.

3. The combination, with the revolving table, the conical rollers, and means for discharging the grain from the table, of a blast-fan for operating on the grain as it falls from the table, substantially as described.

WM. M. ARNALL.

Witnesses:
GEO. W. DYSON,
A. A. SWINDLE.